United States Patent [19]

Parke et al.

[11] 4,340,182
[45] Jul. 20, 1982

[54] MANURE SPREADING APPARATUS

[75] Inventors: Patrick P. Parke, Manhattan, Kans.; Brady G. Bauer; Kenneth G. Meitl, both of Peoria, Ill.; Wayne L. Thompson, Great Falls, Mont.; Thomas J. Voegeli, Peoria, Ill.

[73] Assignee: Kansas State University Research Foundation, Manhattan, Kans.

[21] Appl. No.: 131,799

[22] Filed: Mar. 19, 1980

[51] Int. Cl.³ .............................................. A01C 19/00
[52] U.S. Cl. .................................... 239/680; 239/689; 414/523
[58] Field of Search ............... 239/650, 658, 671, 680, 239/689; 414/507, 512, 518, 523

[56] References Cited

U.S. PATENT DOCUMENTS

| 2,653,028 | 9/1953 | Templeton | 239/680 |
| 2,743,832 | 5/1956 | Kappelmann | 414/518 |
| 3,076,654 | 2/1963 | Colwill et al. | 239/658 |
| 3,212,657 | 10/1965 | Murfitt et al. | 414/512 |
| 3,241,841 | 3/1966 | Kucera | 239/658 |
| 3,301,566 | 1/1967 | Wood | 239/658 |
| 3,613,926 | 10/1971 | Scroggins | 414/523 |
| 3,873,032 | 3/1975 | Jellis, Jr. | 239/671 |

FOREIGN PATENT DOCUMENTS 1191748  5/1970  United Kingdom ............... 239/650

Primary Examiner—Robert B. Reeves
Assistant Examiner—Michael J. Forman
Attorney, Agent, or Firm—Tilton, Fallon, Lungmus & Chestnut

[57] ABSTRACT

A manure spreading apparatus adapted to be movably mounted upon the bed of a farm truck for chopping and spreading a load of manure carried by the truck. During a spreading operation, the apparatus advances from the back to the front of the bed and then reverses direction to return to its starting position. A rotating impeller throws the pieces of manure in a rearward and upward direction with sufficient velocity to clear the back end of the truck bed, and a feeding mechanism in front of the impeller engages the load as the apparatus advances, chopping and tearing the manure into pieces and feeding them towards the impeller. An arcuate top shield combined with a pair of side shields defines an impeller chamber, and a curved deflector plate adjacent the discharge opening of that chamber assists in directing the discharge of material. A scraper plate may be formed integrally with the deflector plate and extends downwardly and rearwardly from the lower limits of the discharge opening to direct manure into such opening, and into contact with the impeller, when the direction of movement of the apparatus is reversed.

17 Claims, 5 Drawing Figures

MANURE SPREADING APPARATUS

BACKGROUND AND SUMMARY

Although power-operated manure spreaders are commercially available, such equipment is generally bulky and expensive and is therefore well suited for use only by large profitable farms having sizable livestock operations. Even then, such equipment may not be entirely satisfactory. For example, a conventional manure spreader commonly takes the form of an attachment adapted to be hitched to a tractor, the spreader being selectively operable to distribute or spread the load as it is pulled by the tractor. To load the spreader, the farmer ordinarily uses a tractor equipped with a front-end loader; hence, a farmer with only one tractor must unhitch the tractor each time the spreader is to be loaded.

Since tractors are relatively slow speed vehicles, the use of a tractor-pulled manure spreader becomes particularly inefficient where the manure must be transported a substantial distance. Using a truck to transport the manure to the distant location effectively reduces hauling time but introduces other complications because a spreading operation is still needed.

Large feedlots have tackled this problem by using trucks with manure-spreading boxes permanently attached to the truck beds. Permanent attachment is a practical necessity because such a spreader is characteristically a heavy unit which operates when the manure load is advanced by chain drag towards the spreader at the rear of the bed. Frequent attachment and detachment of such a unit is not feasible from a practical standpoint and, in terms of economic realities, most livestock operations on small to medium sized farms cannot afford to maintain one truck just for transporting and spreading manure.

Accordingly, it is a principle object of this invention to provide a portable manure spreading apparatus suitable for use on the bed of an average farm truck. Since the manure would be spread directly from the truck, the problems and inefficiencies associated with the use of tractor-drawn spreaders are avoided. The spreader may be readily placed onto or removed from the bed of a farm truck using the front loader of a tractor; hence, the apparatus is particularly suitable for use on small to medium sized farms or, more specifically, on any livestock farm that has need for manure spreading equipment where economy will result from using a truck for spreading manure as well as for other purposes.

Manure spreaders must be sturdily built to stand the stress not only of carrying a large load but of the drag of the movement of the manure load to the spreader mounted at the rear of the machine. This necessarily makes them heavy and expensive. Our invention makes it possible to use a standard flatbed truck which is already capable of carrying the load. The drag-induced stress is eliminated since the load remains stationary on the bed while the spreader mechanism is moved forward into the manure. The stress caused by this motion is carried by the frame of the machine itself.

A further aspect of this invention lies in providing an apparatus which permits manure handling to be done at a faster rate with less equipment than currently employed. The faster rate results largely from less time spent in transit between the loading and spreading locations. In addition, less equipment is required than in the current methods of manure handling. The result is a lowering of labor and equipment costs, allowing the farmer to realize greater profit from his livestock operations.

In brief, the apparatus takes the form of a portable unit which may be easily placed upon and removed from the bed of an average-sized farm truck. The apparatus is placed at the rear of the bed and, in use, advances forwardly towards the load, chopping and shredding the manure and then propelling it in a metered and controlled pattern off of the rear end of the truck. When the apparatus reaches the front of the bed, having cleared the truck of most of its load, the direction of movement of the apparatus is reversed and, as the apparatus returns to its starting position, residual amounts of manure remaining on the bed of the truck are removed and thrown clear of the truck's rear end. The truck is then ready for another load of manure which would be placed on the truck bed in front of the retracted apparatus.

The apparatus includes a movable frame equipped with an impeller mechanism in the form of a transverse horizontal impeller shaft rotatably mounted upon the frame and equipped with a plurality of impeller blades. Power means, preferably in the form of a small internal combustion engine, is mounted upon the frame for rotating the impeller. Top and side shields are secured to the frame about the impeller to define a chamber, the top shield having a transverse front edge which is spaced above the lower limits of the side shields to define an entrance to such chamber. The top shield also has a transverse rear edge spaced above the lower limits of the side shields to define a discharge opening for the chamber. A deflector plate, spaced beneath the rear edge of the top shield, assists in directing the material discharged from the chamber by the impeller.

A feeder mechanism is supported by the frame in front of the impeller to engage and chop the manure into small pieces and feed them to the impeller through the entrance of the housing. A driving mechanism, preferably operated from the cab of the truck, advances the entire apparatus forwardly into contact with the load, such driving means being reversible so that after the load has been distributed the entire assembly may reverse its direction and return to its starting position at the rear of the bed. Ideally, the apparatus is provided with a scraper blade which operates to dislodge material from the bed of the truck as the apparatus travels rearwardly, directing such material towards the impeller chamber where it is contacted by the impeller and thrown rearwardly from the truck.

Other features, objects, and advantages of the invention will become apparent from the specification and drawings.

DRAWINGS

DETAILED DESCRIPTION

Figure 1:
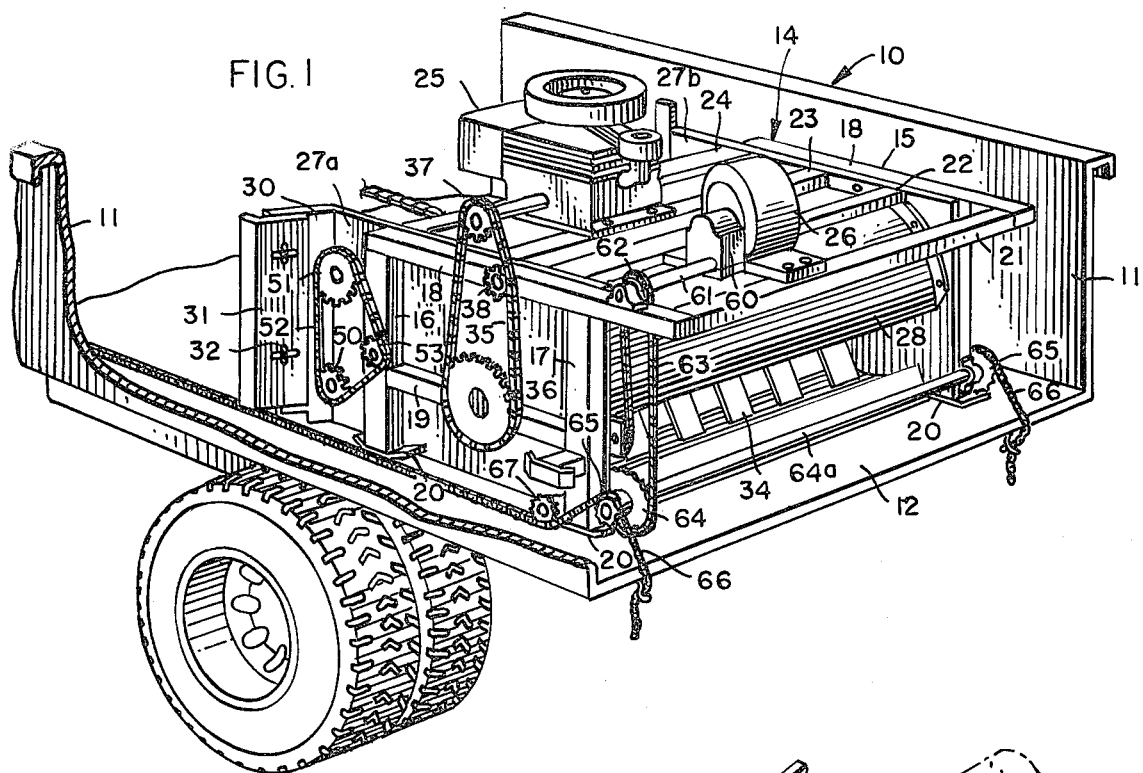
FIG. 1 is a fragmentary perspective view of the bed of a farm truck supporting a manure spreading apparatus embodying this invention.

Referring to the drawings, the numeral 10 generally designates the open-topped box or compartment of a farm truck having side panels 11 and a floor or bed 12. A front wall 13 (FIG. 3) may also be provided adjacent the cab of the truck. A tailgate, usually detachable, may also be provided but, since such a tailgate would normally be removed when the apparatus of this invention is to be used, and would in any case perform no useful function in connection with such apparatus, no tailgate is depicted in the drawings. Also, while the open-topped compartment 10 is described as being part of a farm truck, it is to be understood that the term "truck" need not require that the compartment be part of a self-powered vehicle; for example, the truck might constitute a wagon or cart which has no power means of its own but is designed to be towed by another vehicle.

The manure-spreading apparatus is designated generally by the numeral 14 and includes a box-like frame 15 formed of a multiplicity of interconnected horizontal and vertical frame members. Such members include front and rear corner posts 16 and 17, respectively, joined by longitudinally-extending horizontal frame members 18 and 19. Skids 20, adapted to slidably engage the bed 12 of the truck, are secured to the lower ends of posts 16 and 17. If desired, other friction-reducing means such as rollers might be substituted for skids 20. A plurality of transverse frame members 21-24 extend horizontally between the top members 18 along opposite sides of the frame. In the illustration given, certain of such members support a small engine 25, such as a 10-18 horsepower gasoline engine, while other members (21 and 22) support a reversible electric motor 26.

Figure 2:
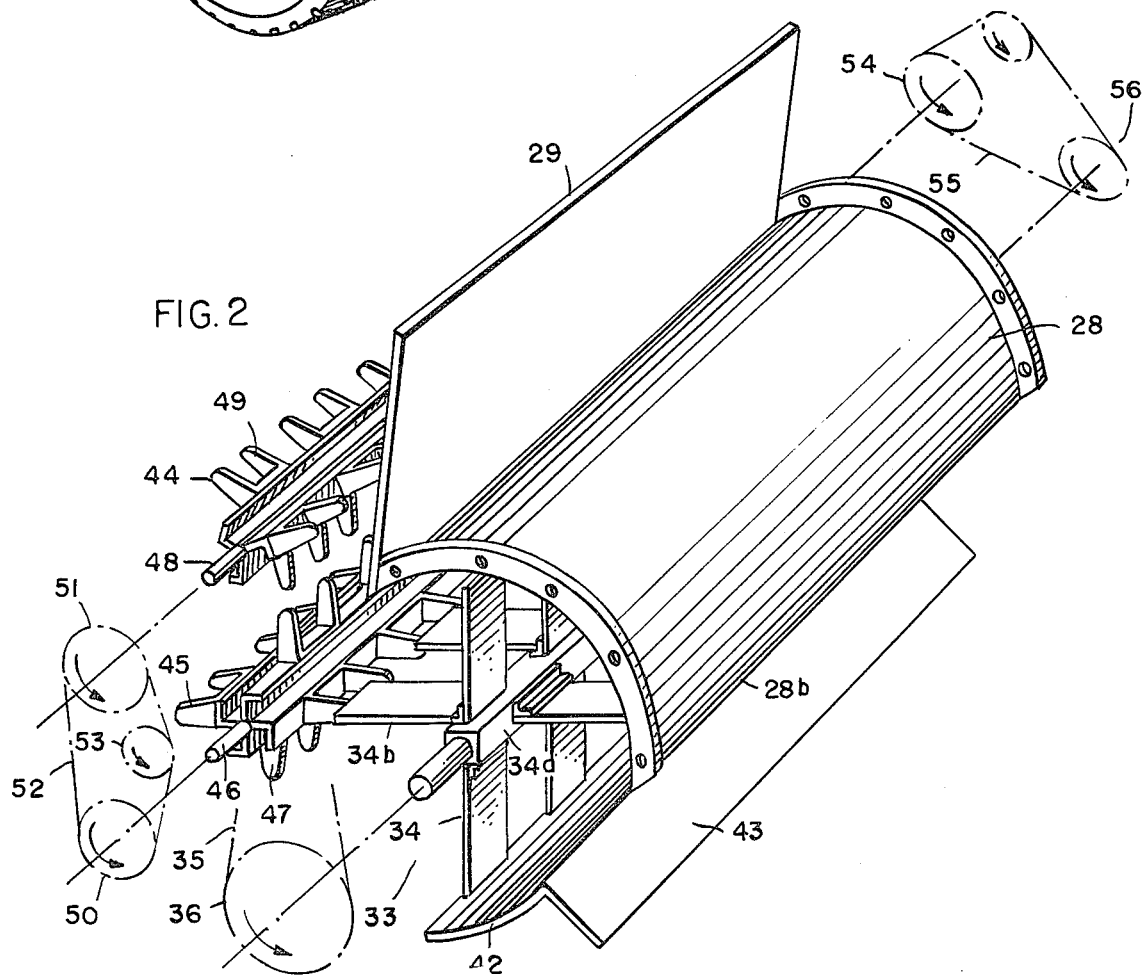
FIG. 2 is a perspective view illustrating the spacial and functional relationships between the impeller, upper and lower impeller shields, and the feeding mechanism.

The skeleton frame 14 supports a pair of side shields 27a and 27b. A top shield 28 is bolted, welded, or otherwise rigidly secured to the side shields. As shown most clearly in FIG. 2, the top plate 28 is arcuate in longitudinal vertical section and is provided at its front with an upstanding guide or retention plate 29. If desired, plate 29 and shield 28 may be formed integrally from the same sheet material.

The vertical side shields 27a and 27b are provided at their forward ends (i.e., the ends facing towards the front of the truck bed) with lateral flanges 30 (FIG. 1). The flanges are angled outwardly and forwardly and are equipped with adjustable extensions 31 which are slotted to receive attachment bolts 32. After the spreader apparatus has been centered upon the bed of a truck, the extensions 31 may be adjusted laterally outwardly so that their outer edges are in close proximity to the inside surfaces of the truck's side panels 11.

The side and top shields define a chamber 33 which houses an impeller 34. As depicted most clearly in FIGS. 2, 4, and 5, impeller 34 includes a transverse horizontal impeller shaft 34a and a multiplicity of paddle-like impeller blades 34b secured to the shaft. The blades are planar, each lying along a plane parallel with the axis of the shaft, and are arranged in staggered opposing pairs, the blades of each pair being disposed at right angles to the blades of an adjacent pair. The stub shafts which project from impeller shaft 34a are journaled in mountings carried by side frame members 19. A chain 35 entrained about sprockets 36-38 operatively connects the impeller to the shaft of engine 25. Rotation of the impeller is in a counterclockwise direction as indicated by arrows 39 in FIGS. 4-5; that is, when the impeller is driven by the engine, impeller blades 34a sweep rearwardly with respect to the bed 12 of the truck as such blades pass through the lowermost portions of their arcs.

Figure 3:
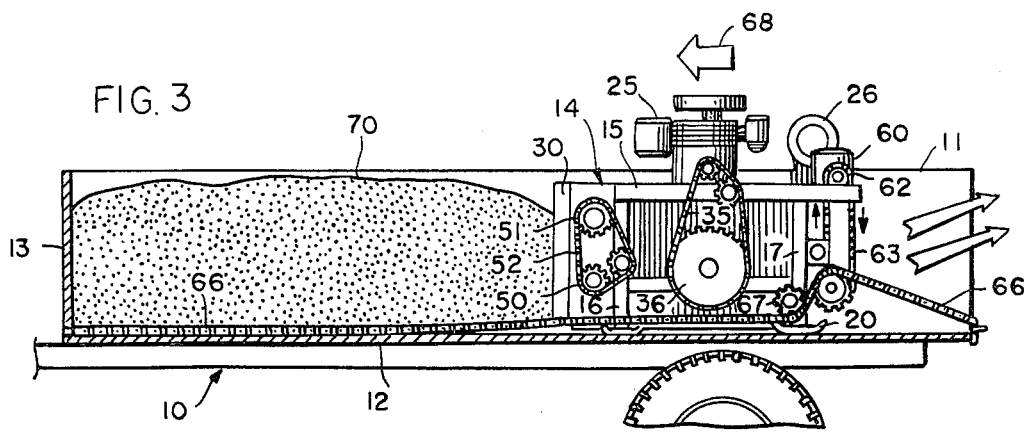
FIG. 3 is a longitudinal vertical sectional view showing the apparatus in operative position on the bed of a truck.
Figure 4:
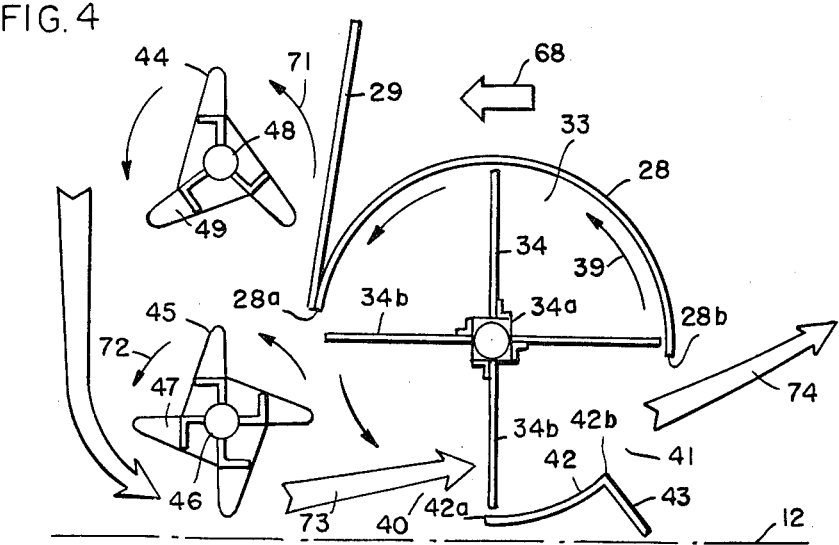
FIG. 4 is a somewhat schematic view illustrating the operative relationship between the impeller and the feeders, and the direction of flow of material through the apparatus, during forward excursion of that apparatus along the bed of a truck.

Referring to FIG. 4, it will be observed that the horizontal front edge 28a of top shield 28 is spaced well above bed 12 to define an entrance or inlet 40 for the impeller chamber 33. Similarly, the horizontal rear edge 28b of the top plate defines the upper limits of a discharge opening or outlet 41. The discharge opening 41 is further defined by a deflector plate 42 which is spaced below rear edge 28b and beneath impeller 34. The front edge 42a of the deflector plate defines the lower limits of entrance opening 40, whereas the rear edge 42b defines the lower limits of discharge opening 41. A scraper blade 43 slopes downwardly and rearwardly from the rear edge 42b of the deflector plate and may be formed integrally with that plate as shown in FIGS. 2-5. Like top shield 28, the arcuate deflector plate 42 and scraper blade 43 are welded or otherwise rigidly secured to the vertical side shields 27a and 27b which define the lateral limits of the impeller chamber.

A feeding mechanism is mounted upon the frame in front of the impeller for directing material into the impeller chamber through entrance 40. In the embodiment illustrated in the drawings, the feeding mechanism includes upper and lower feeding members 44 and 45. The lower member 45 is disposed directly in front of entrance 40 and includes a transverse horizontal shaft 46 with stub ends extending through and journaled upon side shields 27a and 27b. The lower member also includes four rows of staggered blades 47, each blade extending along a plane normal to the rotational axis of shaft 46.

The upper member 44 is disposed directly above lower member 45 and is similarly provided with a horizontal transverse shaft 48 journaled upon side shields 27a and 27b. Three rows of blades 49 are arranged in staggered relation with each blade lying along a plane normal to the rotational axis of shaft 48. Sprockets 50 and 51 are secured to the respective shafts 46 and 48 external to side shield 27a and, in combination with chain 52 and idler sprocket 53, operatively interconnect the upper and lower members 44 and 45 for simultaneous rotation. As shown most clearly in the schematic view of FIG. 2, the opposite end of shaft 46 is also provided with a sprocket 54 which engages a chain 55 extending about a sprocket 56 secured to impeller shaft 34a. Consequently, upper and lower members 44 and 45 are not only coupled to each other but are operatively connected to the impeller 34 and motor 25, and are driven by the motor in the same counterclockwise direction (when viewed as in FIGS. 4-5) as the impeller.

The reversible electric motor 26 provides the driving means for advancing and retracting the spreader assembly 14 along the bed 12 of the truck. As illustrated in FIG. 1, the motor is provided with a gear reduction assembly 60. Output shaft 61 carries a sprocket 62 connected to chain 63. The chain extends downwardly about a lower sprocket 64 secured to transverse shaft 64a. The shaft is journaled in fittings secured to the lower ends of rear posts 17 and is provided at its opposite ends with small driving sprockets 65. A pair of linear link chains 66 extend along opposite sides of bed 12 and are detachably secured at their front and rear ends to the bed. Any suitable cleats or brackets may be used for detachably securing the ends of the chains 66 to the bed 12. As depicted in FIG. 1, guide sprockets 67 may also be mounted upon the frame to guide chains 66 over drive sprockets 65. Therefore, motor 26, along with the chains and sprockets with which it is associated, operates as a winch for progressively driving apparatus 14 forwardly along bed 12, as indicated by arrow 68 in FIG. 3, and, when the apparatus has reached the forward limits of the bed, for reversing the direction of movement and driving the apparatus rearwardly back into the original starting position of FIGS. 1 and 3. Suitable limit switches (not shown) are provided for limiting the extent of movement of the apparatus in each direction, and a control switch, preferably operable from within the cab of the truck or towing vehicle, is used to stop and start the motor. Ideally, the current for operating the motor is obtained from the engine battery of the truck or towing vehicle.

FIG. 3 illustrates the apparatus at the commencement of a spreading operation. Winch motor 26 is energized to advance the apparatus from the rear end of bed 12 to the forward end thereof, in the direction represented by arrow 28, and engine 25 drives impeller shaft 34a and feed shafts 46 and 48 to chop or fragment the material of load 70 and to propel the pieces rearwardly through discharge opening 41 and beyond the rear end of the truck. The operation is graphically illustrated in FIG. 4 where it will be seen that the blades of the upper feed member 44 rotate in a direction to chop downwardly into the load (arrow 71), driving the pieces or fragments towards lower feed member 45. The blades of the lower feed member rotate in the same direction as those of the upper feed member, driving the fragments downwardly and then rearwardly into the impeller chamber 33 (arrows 72 and 73). The chopping or cutting action of the blades of the feed members is promoted by the fact that such blades are oriented so that they lie along planes normal to the rotational axes of such members. When the fragments or pieces enter the impeller chamber, they are contacted by the paddle-like blades 34a of the impeller, rotating in the direction indicated by arrow 39, and are directed rearwardly and upwardly with a velocity sufficient to clear the rear end of the bed (arrow 74).

The trajectory of the material thrown by the impeller 34 depends on a number of factors, including the velocity of the impeller and the size and location of discharge opening 41. While it is believed that considerable variation is possible, effective results have been obtained where the upper edge 42b of the curved deflector plate 42 and the lower edge 28b of impeller shield 28, which define the lower and upper limits of the discharge opening 41, are oriented so that material leaving the impeller will be discharged rearwardly and upwardly at an angle within the range of 20° to 70° from the horizontal. The preferred range is believed to be about 25° to 65° from the horizontal. For an impeller having a diameter of 20 inches, a rotational speed of 300 rpm has been found effective. Satisfactory performance under such conditions has been obtained with rotational speeds of 58 rpm for the upper feeder and 113 rpm for the lower feeder; however, as indicated, such rotational speeds may be increased substantially, or even decreased, without destroying or impairing effectiveness of operation.

Figure 5:
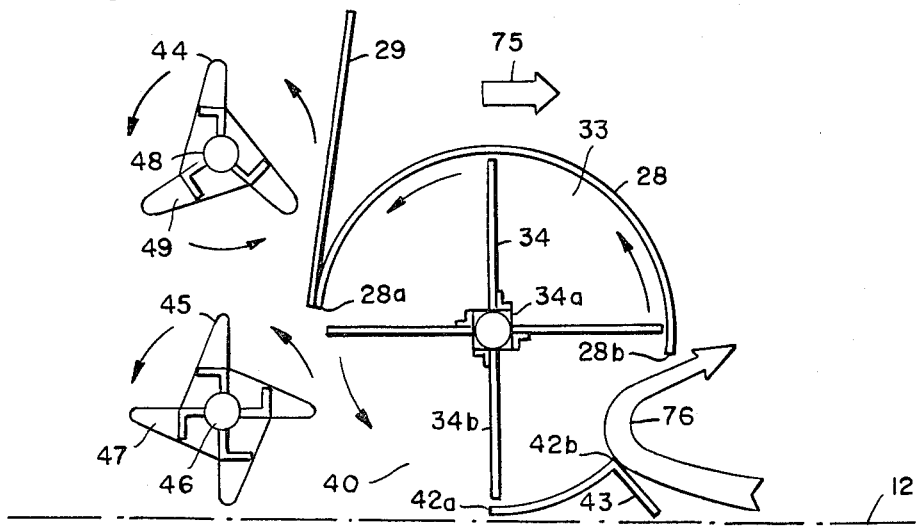
FIG. 5 is a schematic view similar to FIG. 4 but depicting the functional relationship of parts as the apparatus travels rearwardly along the bed of a truck.

When the manure spreading apparatus has reached the front of the bed, its direction of movement is reversed as indicated by arrow 75 in FIG. 5. Scraper blade 43 moves rearwardly along bed 12 to lift material from the bed (that was not thrown clear of the truck during forward movement of the apparatus) and direct it into the impeller chamber 33 through opening 41. The impeller, which has continued to rotate without interruption, contacts the material lifted by scraper blade 43 and propels it upwardly and rearwardly as indicated by arrow 76. Consequently, during reverse movement of the apparatus along bed 12, the apparatus performs a cleaning operation and, at the same time, repositions itself at the rear of the bed so that a further load may be received by the truck on bed 12 in front of the retracted manure spreading apparatus.

In the above description, separate power units (engine 25 and motor 26) have been disclosed for operating the impeller and feeding mechanism and for advancing the apparatus into the load; however, it is believed apparent that by utilizing appropriate clutching, gear-reducing, and power-transmitting mechanisms a single power source might be utilized for all of such operations. Also, while not shown in the drawings, suitable slip clutches might be incorporated in the drive trains for the impeller/feeder and the advancing mechanism.

While in the foregoing we have disclosed an embodiment of the invention in considerable detail for purposes of illustration, it will be understood by those skilled in the art that many of these details may be varied without departing from the spirit and scope of the invention.

We claim:

1. A manure spreading apparatus comprising a frame adapted to be movably supported upon the bed of a truck for forward and rearward movement between the front and rear ends of such bed; driving means for progressively and selectively moving said apparatus forwardly and rearwardly upon such bed; an impeller assembly comprising an impeller having a transverse horizontal shaft rotatably mounted upon said frame and a plurality of impeller blades fixed to said shaft, and power means for rotating said impeller; top and side shields secured to said frame about said impeller to define an impeller chamber; said top shield having a transverse front edge spaced above the lower limits of said side shields to define an entrance to said chamber and having a transverse rear edge spaced above the lower limits of said side shields to define a discharge opening for said chamber; feeding means supported by said frame in front of said impeller for feeding manure into the entrance for said chamber when said apparatus is moved forwardly into engagement with a load of manure disposed on said bed; and a deflector plate spaced beneath the rear edge of said top shield and extending rearwardly and upwardly from beneath said impeller for directing manure contacted by the blades of said impeller upwardly and rearwardly through said discharge opening.

2. The apparatus of claim 1 in which said impeller is rotated by said power means in a direction wherein said blades travel rearwardly as they describe the lower portion of their arc of rotation.

3. The apparatus of claim 2 in which said deflector plate is arcuate and curves rearwardly and upwardly along the lower portion of the arc of rotation of said impeller blades.

4. The apparatus of claim 1 in which said impeller blades are generally planar and extend along planes parallel to the axis of said shaft.

5. The apparatus of claim 1 in which said feeding means comprises at least one transverse feeder shaft rotatably mounted upon said frame in front of said impeller, a plurality of blades extending radially from said feeder shaft, and drive means for rotating said feeder shaft and blades for directing manure into said entrance of said impeller chamber.

6. The apparatus of claim 5 in which said feeder shaft is rotated by said driving means in the same direction as said impeller shaft.

7. The apparatus of claim 6 in which said feeder blades are planar and extend along planes generally normal to the axis of said feeder shaft.

8. The apparatus of claim 6 in which said feeding means includes a second transverse feeder shaft disposed above said first-mentioned feeder shaft and is also rotatably mounted upon said frame, said feeder drive means being operatively connected to said second shaft for driving the same in synchronization with said first shaft.

9. The apparatus of claim 8 in which said second feeder shaft rotates in the same direction as said first feeder shaft.

10. The apparatus of claim 9 in which the blades of said second feeder shaft are planar and extend along planes generally normal to the axis of that shaft.

11. The apparatus of claim 1 in which said driving means for progressively moving said apparatus forwardly and rearwardly along said bed comprises a winch mechanism having a pair of power-driven sprockets disposed on opposite sides of said frame, and a pair of linear chains adapted to be attached to said truck along opposite longitudinal sides of said bed for engagement by said sprockets.

12. The apparatus of claim 11 in which said sprockets are driven by a reversible electric motor.

13. The apparatus of claim 12 in which said sprockets are located adjacent the lower rear corners of said frame.

14. The apparatus of claim 1 in which said frame is provided with friction-reducing means for movably engaging the bed of a truck.

15. The apparatus of claim 1 in which said deflector plate is arcuate and curves upwardly and rearwardly to a transverse horizontal edge defining the lower limits of said discharge opening, said horizontal edge of said deflector plate and said transverse rear edge of said top shield being spaced apart a distance to restrict the discharge of material through said discharge opening by said impeller to a discharge angle within the range of 20° to 70° measured from the horizontal.

16. A manure spreading apparatus comprising a frame adapted to be movably supported upon the bed of a truck for forward and rearward movement between the front and rear ends of such bed; driving means for progressively and selectively moving said apparatus forwardly and rearwardly upon such bed; an impeller assembly comprising an impeller having a transverse horizontal shaft rotatably mounted upon said frame and a plurality of impeller blades fixed to said shaft, and power means for rotating said impeller; top and side shields secured to said frame about said impeller to define an impeller chamber; said top shield having a transverse front edge spaced above the lower limits of said side shields to define an entrance to said chamber and having a transverse rear edge spaced above the lower limits of said side shields to define a discharge opening for said chamber; feeding means supported by said frame in front of said impeller for feeding manure into the entrance for said chamber when said apparatus is moved forwardly into engagement with a load of manure disposed on said bed; a deflector plate spaced beneath the rear edge of said top shield and extending beneath said impeller for directing manure by the blades of said impeller upwardly and rearwardly through said discharge opening; said impeller being rotated by said power means in a direction wherein said blades travel rearwardly as they describe the lower portion of their arc of rotation; said deflector plate being arcuate and curving rearwardly and upwardly along the lower portion of the arc of rotation of said impeller blades; and a scraper plate being spaced beneath the rear edge of said top shield and extending downwardly and rearwardly beyond the rear limits of said deflector plate for directing manure into said discharge opening and into contact with said impeller when said apparatus is moved rearwardly along said bed.

17. The apparatus of claim 16 in which said deflector plate and said scraper plate are integrally formed.

* * * * *